United States Patent
Barton, Jr.

[11] Patent Number: 5,509,240
[45] Date of Patent: Apr. 23, 1996

[54] SYSTEM FOR FORMING LINED PASSAGES THROUGH CONCRETE WALLS

[76] Inventor: Bruce G. Barton, Jr., 10823 Plaza Dr., Whitmore Lake, Mich. 48189

[21] Appl. No.: 746,896

[22] Filed: Aug. 19, 1991

[51] Int. Cl.$^6$ .................................................. E04C 2/52
[52] U.S. Cl. ........................... 52/220.8; 52/503; 285/363
[58] Field of Search ............................ 52/200, 196, 219, 52/303, 503, 504, 220.8; 249/22, 23, 33, 34, 49, 184; 285/19, 20, 363

[56] References Cited

U.S. PATENT DOCUMENTS

| | | |
|---|---|---|
| 2,065,072 | 12/1936 | Hertzka . |
| 3,396,539 | 8/1968 | Khan et al. ................................. 52/196 |
| 3,528,668 | 9/1970 | Barton . |
| 3,914,843 | 10/1975 | Antonacci ............................. 52/220 X |
| 3,988,867 | 11/1976 | Väänänen ............................. 52/220 X |
| 4,399,315 | 8/1983 | Iida ..................................... 285/363 X |
| 4,598,519 | 7/1986 | Reid ..................................... 249/43 X |
| 4,625,940 | 12/1986 | Barton . |
| 4,852,319 | 8/1989 | Cowan ................................ 52/303 X |

FOREIGN PATENT DOCUMENTS

| | | | |
|---|---|---|---|
| 3146007 | 5/1983 | Germany ................................. 249/39 |

OTHER PUBLICATIONS

P. 6 1985 Thunderline Catalog LS-119-G.

*Primary Examiner*—Kien T. Nguyen
*Attorney, Agent, or Firm*—Dorn, McEachran, Jambor & Keating

[57] ABSTRACT

A system for producing a sleeve-lined passage of uniform diameter D through a concrete wall molded in a concrete wall form including first and second form plates mounted in fixed relation and spaced by a wall width W includes a multiplicity of modular spools, preferably made of sheet steel; each spool comprises an annular shell having an axial length L less than W and an inside diameter D with front and rear flat flanges extending outwardly of the front and rear rims of the shell. For a first group of spools the axial length L is of three inches; for the other spools length L of four inches.

9 Claims, 2 Drawing Sheets

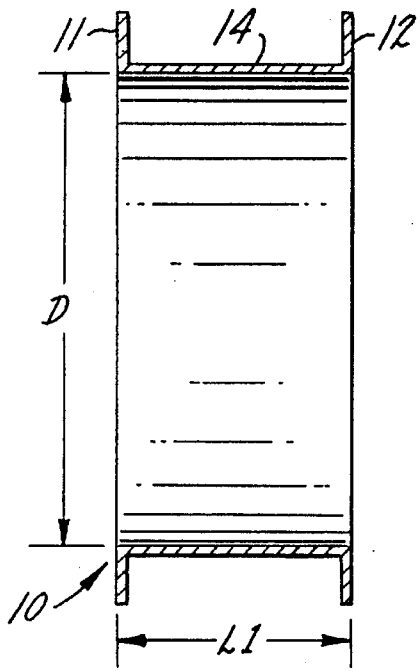
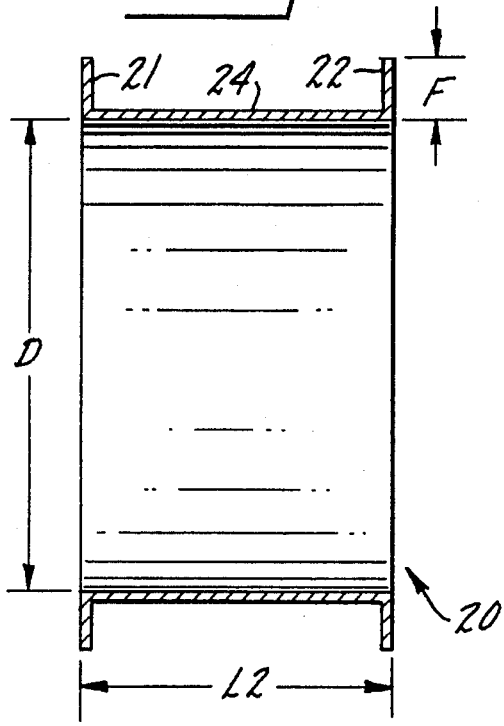
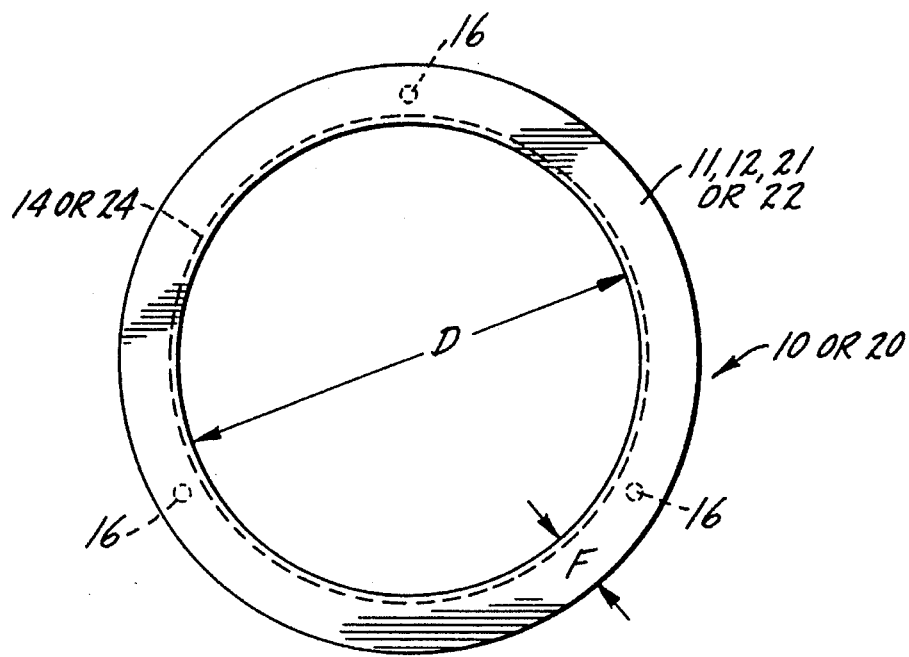

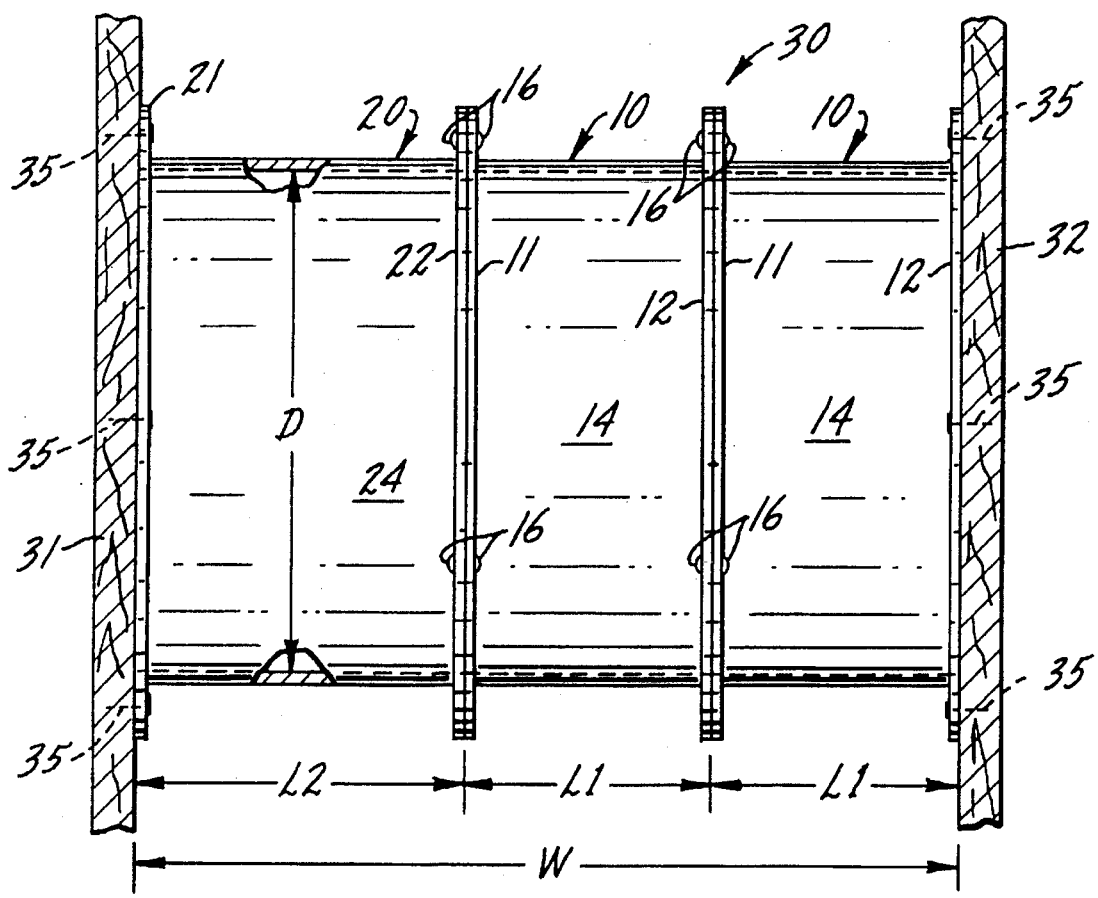

SYSTEM FOR FORMING LINED PASSAGES THROUGH CONCRETE WALLS

BACKGROUND OF THE INVENTION

In this specification and in the appended claims, a "wall" may be horizontal, vertical, or at any desired angle; thus, a "wall" may be a floor, a ceiling, or a roof.

In new construction, whether for commercial, residential, industrial, bridge, road, or other use, it is often necessary to extend a pipe or conduit for a water, gas, or electrical line through a concrete wall. It is frequently desirable or even mandatory to provide a hydrostatic seal around the pipe or conduit to preclude seepage of water or other fluid through the wall. The most practical and effective seal construction for applications of this kind, in most instances, is an expansion seal formed of a series of interleaved blocks of rubber or other elastomer interconnected by a sequence of pressure plates, with a plurality of bolts extending between the pressure plates; the bolts are tightened to squeeze the elastomer blocks between the pressure plates, expanding the blocks to form a continuous hydrostatic seal around the pipe. A preferred construction for a wall seal closure of this kind is disclosed in U.S. Pat. No. 3,528,668 of Bruce G. Barton. Other wall closure seal constructions for forming peripheral seals on pipes and conduits are also known in the art.

To assure an effective seal, in applications of this kind, it is highly desirable and often necessary to form a passage through the wall, through which the pipe or conduit can extend, with an internal diameter large enough to afford an essentially symmetrical annular space between the pipe and the passage surface. The diameter of the wall passage may vary to a substantial extent, depending upon the outside diameter of the pipe or conduit and the particular seal to be used. Thus, the internal diameter required for the wall opening may range from under two inches to two feet or even more. For most constructions of this kind, in concrete walls, a sleeve anchored in and extending through the concrete wall has been employed.

One commercial construction uses a steel tube having a length equal to the width of the wall and having an annular steel flange welded to the outside central portion of the sleeve. Heavy wall (0.25 to 0.5 inch) steel pipe is usually used. The flange serves as a water stop that precludes water seepage along the outer surface of the sleeve, at the interface between the sleeve and the concrete wall. The flange also serves as an anchor that precludes axial movement of the wall sleeve. This steel wall sleeve construction, however, presents some substantial technical difficulties. Thus, there is a requirement for a substantial inventory of sleeves of differing lengths and diameters; the wide variations in wall width and in required sleeve diameter produce too many combinations for an economical inventory. Corrosion, cost, and sleeve weight are continuing problems.

Another wall sleeve construction, one which effectively overcomes many of the disadvantages of steel wall sleeves, is disclosed in U.S. Pat. No. 4,625,940 of Bruce G. Barton. That wall sleeve starts with a molded resin precursor having cup-like end caps of an outside diameter D formed integrally with the opposite ends of a main sleeve having an inside diameter D. In use, the end caps are cut off the main sleeve and mounted in a concrete form, with the sleeve section fitted onto the two cap sections. When the wall has been poured and set, the end caps are removed along with the concrete form, leaving a wall sleeve suitable for use with a conduit and expandable seal, as described above.

The wall sleeve precursors of U.S. Pat. No. 4,625,940 can be used to produce a long wall sleeve by cutting off the end wall of a cap section on one sleeve precursor and inserting it into the end of another precursor from which the complete cap section has been removed. But the resulting extended sleeve leaves much to be desired. At best, if the two precursors are joined by a thermal weld there is usually a ridge inside the joint and an appreciable reduction in inside diameter. The joint is not usually as strong as desired. Auxiliary fasteners such as self-tapping screws are often needed, along with a messy external sealant. Screws or other fasteners may project into the sleeve and create an appreciable obstruction in it. Labor expense is substantial, and scrap is usually undesirably high.

Another wall sleeve system, which provides appreciable improvements and affords an unobstructed wall sleeve of extended length with strong sealed joints, minimal labor costs, and no screws or other fasteners, is disclosed in Bruce G. Barton Jr. U.S. patent application Ser. No. 7/645,805 filed Jan. 25, 1991. In that system a cylindrical wall sleeve assembly forming an unimpeded passageway of consistent internal diameter through a concrete wall of given width comprises a first unitary one-piece cylindrical molded resin sleeve member having an internal diameter $D1$; a joint end of the first sleeve member terminates in a substantially flat radial flange having an external diameter $D2$, with $D2>D1$. There is also a second unitary one-piece cylindrical molded resin sleeve member having an internal diameter $D1$; a joint end of the second sleeve member terminates in a substantially flat radial flange having an axially projecting outer rim with an internal diameter $D2$. The joint ends of the first and second sleeve members are firmly secured to each other with their radial flanges in abutting engagement to afford an assembled sleeve having an overall length approximately equal to the wall width. Finally, there are a pair of end members, each including a cylindrical body having an external diameter $D1$ to fit tightly into an open end of the assembled sleeve, each end member having a substantially flat radially outwardly projecting mounting flange at its outer end which limits insertion of the end member into the sleeve; the end member flanges comprise mounting means for mounting the assembly in fixed position between the opposed walls of a concrete form while allowing removal of both end members, upon dismantling of the form, for full exposure of the interior of the sleeve.

All of these systems provide passages through concrete walls that are well adapted to use with the seal of U.S. Pat. No. 3,528,688, but all have continuing problems. For steel sleeves, weight, cost, and inventory problems are principal difficulties. For resin sleeves, inadequate structural integrity in large sizes (commercial resin sleeves are pretty well limited to wall openings of less than twenty-five inches diameter) and poor bonding to the concrete, along with water leakage and through-wall fire limitations are common problems. An additional, non-technical problem, is the reluctance of some structural wall designs to use resin wall sleeves. They would rather accept the disadvantages of conventional steel sleeves than change.

SUMMARY OF THE INVENTION

It is a main object of the invention, therefore, to provide a new and improved system for forming a smooth, sleeve lined passage through a concrete wall, a passage well suited to installation of a wall seal closure such as that of Barton U.S. Pat. No. 3,528,668, particularly for passage diameters under two feet.

Another object of the invention is to provide a new and improved system for forming a sleeve lined passage through a concrete wall that is simple and inexpensive and that avoids or minimizes the difficulties of the prior art as described above.

Accordingly, the invention relates to a system of modular spools to be joined together in a unitary stack and mounted in a concrete wall form to create a lined passage of uniform diameter D through a concrete wall molded in the concrete wall form, the concrete wall form including first and second form plates mounted in fixed spaced relation to each other and separated by a wall width W. The system includes a multiplicity of modular spools, with each spool comprising an annular shell having an inside diameter D and an axial length less than W; flat front and rear flanges extend outwardly of the front and rear rims, respectively, of the shell. There is a first plurality of the spools each having an axial length L1, a further plurality of the spools each having an axial length L2, with L1<L2; the difference between L1 and L2 is of the order of one inch and L2 is no larger than six inches. Preferably, L1 is approximately three inches and L2 is approximately four inches; thus, the spools can be affixed to each other in stacks that accommodate wall widths varying by only about one inch over a wide width range.

DESCRIPTION OF THE DRAWINGS

FIG. 1A is a sectional side elevation view of one wall sleeve spool used in a preferred system according to the invention;

FIG. 1B is a sectional side elevation view of another wall sleeve spool, used in the same system with the spool of FIG. 1A;

FIG. 2 is an end elevation view applicable to either of the wall sleeve spools of FIGS. 1A and 1B; and FIG. 3 is a side elevation view of a complete wall sleeve spool stack, in a concrete form ready for pouring concrete, using the spools of FIGS. 1A, 1B and 2.

DESCRIPTION OF THE PREFERRED EMBODIMENTS

FIGS. 1A and 2 illustrate a first modular spool 10 used in a system according to a preferred embodiment of the invention. Spool 10 has an inside diameter D and an overall length L1. Spool 10 further includes flat front and rear flanges 11 and 12 which extend outwardly from the front and rear rims, respectively, of the central spool shell 14.

FIGS. 1B and 2 illustrate the construction of a second modular sleeve spool 20 used in the same system as spool 10. Spool 20 has the same internal diameter D as spool 10. Its overall length L2 is different from the length L1 of spool 10. Spool 20 also includes flat front and rear flanges 21 and 22 that project outwardly of the front and rear rims, respectively, of the central shell 24 of the spool.

Spools 10 and 20 may be fabricated of thin-wall lightweight low carbon steel, preferably zinc plated. Typically, the steel utilized may be of the 1010 or 1020 variety and the wall thickness for the steel utilized in spools 10 and 20 may be in the range of 20 gauge to 10 gauge. The length L1 for spool 10 is preferably three inches and the length L2 for spool 20 is four inches. This makes it possible to combine the spools in stacks to match any desired wall width W (FIG. 3) in increments of one inch, so that these two spool lengths L1 and L2 can accommodate virtually any concrete wall width for a passage of diameter D. The flanges on spools 10 and 20 are preferably of uniform height F; typically, F may be about three quarters inch for spools of small diameter D, with larger flange dimensions F for larger spools. The inside diameter D of the spools may range from two inches up to about twenty four inches or even larger.

FIG. 3 shows two spools 10 and one spool 20 fixedly joined together in a unitary stack 30 and mounted in a concrete wall form comprising two form plates 31 and 32 spaced from each other by a wall width W. If the spool lengths L1 and L2 are three inches and four inches, as indicated above, the overall wall thickness W is ten inches. That is, all of the spools in stack 30, together, provide a passage length that is equal to the wall thickness W.

Prior to mounting stack 30 in the form comprising plates 31 and 32, it is necessary to join the three spools together. Initially, the mating surfaces of the flanges, such as the flange 22 on spool 20 and the flange 11 on the adjacent spool 10, are brushed or otherwise coated with a chemical adhesive. The flanges are then pressed together and the adhesive is allowed to set, at least to some extent, to provide initial positioning of the spools relative to each other. The same technique is utilized with the flanges 11 and 12 on the joint between the two spools 10 at the right hand side of stack 30. An appropriate adhesive is silicone adhesive sealant, but others may also be used.

Subsequently, each mating pair of flanges is spot welded or otherwise joined together; mechanical clinching can be used. Typically, three spot welds or clinched areas may be employed, as indicated by the welds 16 in FIGS. 2 and 3. In this way, all of the spools comprising stack 30 are effectively, firmly and permanently joined together. The adhesive used between the flanges remains in place so that the joint between the flanges is essentially waterproof. Of course, the flanges in the center of stack 30 function as water stops and anchoring plates in the same manner as in conventional wall sleeves.

In installing the wall sleeve stack 30 in the concrete form 31, 32, one outside flange of the stack, such as flange 21, is nailed to the inside surface of form member 31, as by nails 35. Appropriate nail holes (not shown) may be provided in the spool flanges 11, 12, 21 and 22. For light-gauge sheet metal spools, however, nail holes may be unnecessary. The other outside flange, such as the flange 12 at the right hand side of the stack, is engaged by the other form 32. Additional nails 35 may be used to secure flange 12 to plate 32.

After the concrete for the wall is poured into the form 31, 32, and the concrete has set, the form plates 31 and 32 are removed. Stack 30 is firmly encased in the wall, in the same manner as a conventional metal or resin wall sleeve. It affords a wall passage of uniform internal diameter D1 through the wall, and thus constitutes an ideal site for a peripheral expandable seal such as the kind disclosed in Barton U.S. Pat. No. 3,528,668. Although spools 10 and 20 are formed of thin gauge metal, there is adequate strength due to the short axial lengths L1 and L2 of the spools. Thus, even with light steel construction, the spools are sufficiently strong to be used for wall passages having diameters up to two feet. When constructed of metal as described (a similar system can be provided with resin spools) the wall passage is essentially fireproof. The modular lengths L1 and L2, as previously noted, accommodate virtually any wall width W. For any diameter D it is necessary to stock only two lengths L1 and L2 of the spools; this arrangement is sufficient to accommodate walls of virtually any thickness. Thus, the inventory required to be able to meet demands for virtually any wall is materially reduced; for any diameter D, a stock of spools of only two lengths L1 and L2 is adequate.

I claim:

1. A system of modular spools to be joined together in a unitary stack and mounted in a concrete wall form to create a lined passage of uniform diameter D through a concrete wall molded in the concrete wall form, the concrete wall form including first and second form plates mounted in fixed spaced relation to each other and separated by a wall width W, the system including a multiplicity of modular spools, with each spool comprising:

- an annular shell having an inside diameter D, an axial length less than W, a front rim, and a rear rim;
- flat front and rear flanges extending radially outwardly of the front and rear rims, respectively, of the shell, and the flanges each having an inner diameter D, so that a series of the spools can be assembled, end-to-end and flange-to-flange, without change of the internal diameter D through the entire assembly;
- a first plurality of the spools each having an axial length L1;
- and a further plurality of the spools each having an axial length L2, with L2>L1;
- the difference between L1 and L2 being one inch (2.5 cm) and L2 being no larger than six inches (15 cm).

2. A system of modular spools for creation of a lined passage of uniform diameter D through a concrete wall according to claim 1 in which L1 is three inches (7.5 cm) and L2 is four inches (10 cm).

3. A system of modular spools for creation of a sleeve-lined passage of uniform diameter D through a concrete wall according to claim 1 in which each of the modular spools is formed entirely of light gauge steel.

4. A system of modular spools for creation of a lined passage of uniform diameter D through a concrete wall according to claim 1 in which all flanges on all spools are formed of light gauge metal so that all spools in a stack for a given passage can be joined to each other by spot welding the flanges together.

5. A system of modular spools for creation of a lined passage of uniform diameter D through a concrete wall according to claim 1 in which the outer surface of one flange on each spool is coated with adhesive so that the mating surfaces between spool flanges in a stack can be joined to each other by the adhesive.

6. A system of modular spools for creation of a lined passage of uniform diameter D through a concrete wall according to claim 4 in which the outer surface of one flange on each spool is coated with adhesive so that the mating surfaces between spool flanges in a stack can be joined to each other by the adhesive.

7. A system of modular spools for creation of a lined passage of uniform diameter D through a concrete wall according to claim 6 in which each of the modular spools is formed entirely of light gauge steel.

8. A system of modular spools for creation of a lined passage of uniform diameter D through a concrete wall according to claim 7 in which L1 is three inches (7.5 cm) and L2 is four inches (10 cm).

9. A system of modular spools for creation of a lined passage of uniform diameter D through a concrete wall according to claim 1 in which all flanges on all spools are formed of plastic so that all spools in a stack for a given passage can be joined to each other by spot welding the flanges together.

* * * * *